United States Patent [19]

Shindo et al.

[11] Patent Number: 5,710,042

[45] Date of Patent: *Jan. 20, 1998

[54] SOLID ORGANIC WASTE PROCESSING APPARATUS

[75] Inventors: Yasuhiro Shindo, Ohira-machi; Usaburo Yamaguti, Tochigi; Takayuki Fushiki; Hajime Nomura, both of Ohira-machi; Tosio Suzuki, Tatebayashi, all of Japan

[73] Assignee: Hitachi, Ltd., Tokyo, Japan

[*] Notice: The term of this patent shall not extend beyond the expiration date of Pat. No. 5,587,320.

[21] Appl. No.: 515,365

[22] Filed: Aug. 15, 1995

[30] Foreign Application Priority Data

Aug. 19, 1994 [JP] Japan .................................. 6-195075
Aug. 19, 1994 [JP] Japan .................................. 6-195076

[51] Int. Cl.$^6$ .................................................... C12M 3/00
[52] U.S. Cl. .................................. 435/290.1; 435/290.2; 435/290.4
[58] Field of Search ........................... 435/290.1, 290.2, 435/290.4

Primary Examiner—David A. Redding
Attorney, Agent, or Firm—Antonelli, Terry, Stout, & Kraus, LLP

[57] ABSTRACT

The present invention relates to a high-speed and high-decomposition-ratio solid organic waste processing apparatus which does not scatter around unpleasant odor or a large amount of vapor, which does not need to add saw dust, rice hulls, etc. as a water content adjustment material and which can be installed compactly with excellent space performance even in narrow stores or business facilities in cities, wherein a heat exchanger for condensing vapor in a gas transferred from a processing tank into a liquid is disposed via an interval at a side of a compost discharging side of the processing tank which is difficult to receive thermal influence, a blast fan for blowing outside air to the heat exchanger is arranged at a side of the heat exchanger opposite the side of the processing tank, and a neutralizing apparatus for neutralizing water condensed by the heat exchanger and a deodorizing apparatus for deodorizing a portion of the gas transferred from the processing tank are arranged at a lower side of the heat exchanger.

17 Claims, 8 Drawing Sheets

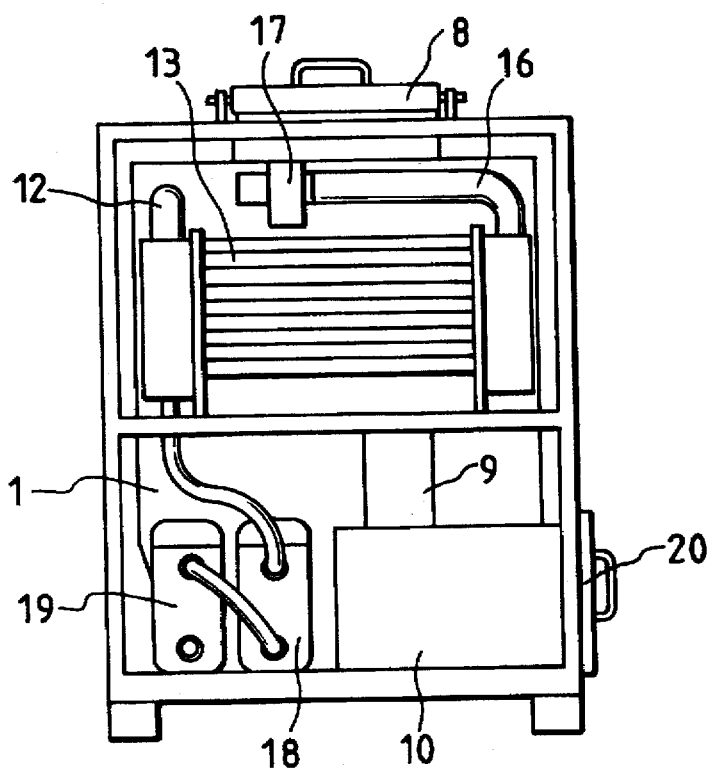
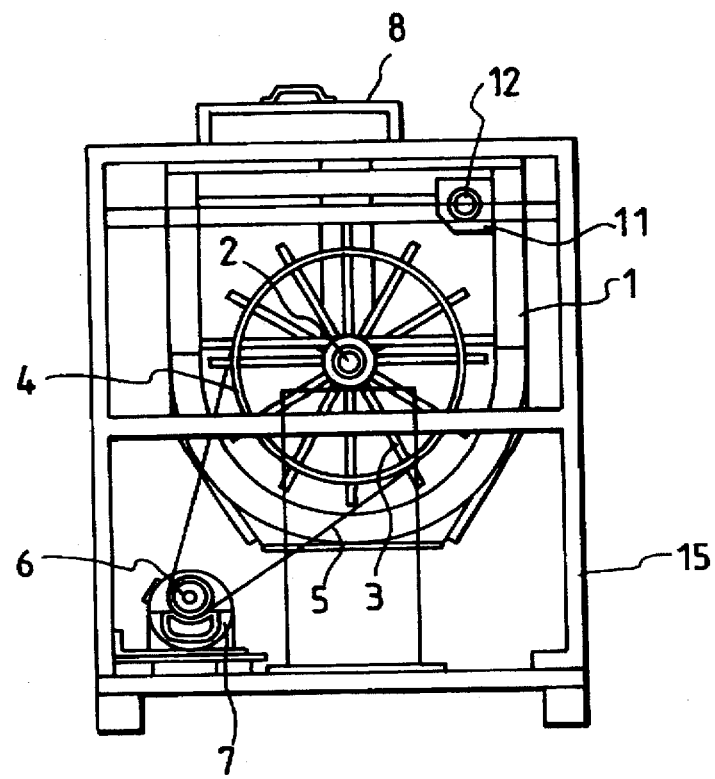

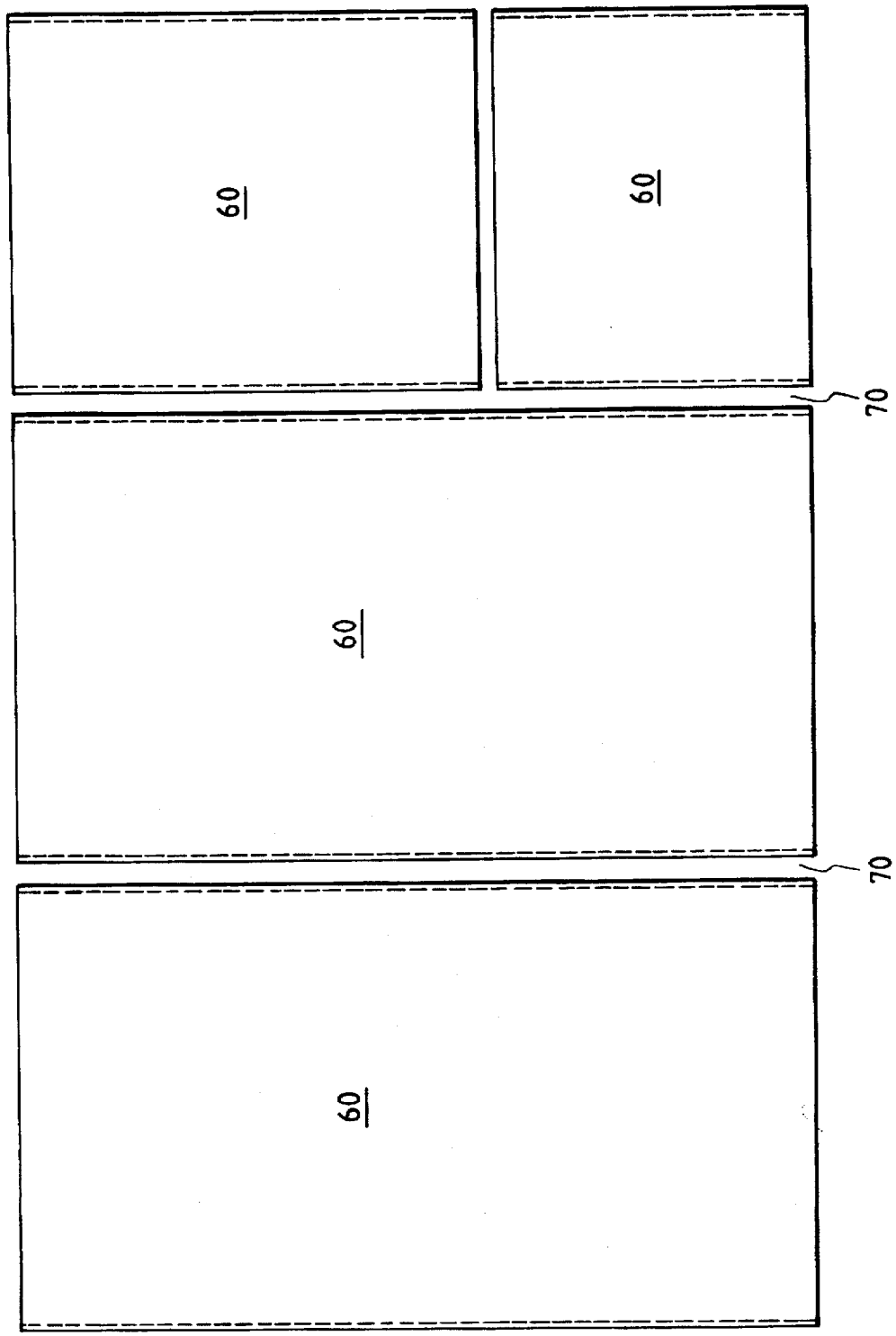

SOLID ORGANIC WASTE PROCESSING APPARATUS

BACKGROUND OF THE INVENTION

1. Field of the Invention

The present invention relates to a solid organic waste processing apparatus, and more particularly, to a solid organic waste processing apparatus for processing solid organic waste as a whole such as kitchen waste (kitchen garbage), waste dumped in towns, waste generated in a food manufacturing process, biomass and the like by aerobic fermentation, and this apparatus can be widely applied to a home use, business use and public use and further used in an industrial scale.

2. Discussion of Background

Recently, a technology for processing solid organic waste by aerobic fermentation or a technology for making waste to compost is evaluated again because it is not only a processing method by which no pollution is caused but also a technology for reusing waste and returning waste to nature.

In particular, as stock breeding industry consuming a large amount of left over food has been switching kitchen waste or so-called kitchen garbage to synthetic feed, a processing apparatus capable of fermenting the kitchen waste at high speed and high decomposition ratio while solving the problem of odor pollution has been desired.

Conventionally, solid waste such as agriculture waste or sewage sludge is converted into compost in such a manner wherein it is naturally fermented by maintaining it in a state of heaping in field for a long period of time without any positive control.

By contrast, examples of development of accelerating the fermentation by agitation or partially controlling supply of oxygen by using fermentation apparatuses have been increased. For example, Japanese Unexamined Patent Publication No. 228986/1988, Japanese Unexamined Patent Publication No. 145388/1989, Japanese Unexamined Patent Publication No. 172074/1994, German Patent Publication No. DE4034400A1, etc. are known.

Further, the applicants previously proposed in U.S. patent application Ser. No. 08/292204 (applied on Aug. 19, 1994), now U.S. Pat. No. 5,587,320, a solid organic waste processing apparatus comprising a solid organic waste processing unit having a processing tank provided with a crushing unit for receiving and crushing solid organic waste and a processing unit for agitating and fermenting crushed waste; a heat exchanger provided outside of the solid organic waste processing unit, for condensing vapor in a gas transferred from the solid organic waste processing tank into a liquid and exhausting the liquid; and a gas circulating mean for operationally connecting the inside of the processing tank in the solid organic waste processing unit to the heat exchanger, forming a gas circulating path transferring the gas in the processing tank of the solid organic waste processing unit to the heat exchanger and recirculating most of the gas processed in the heat exchanger to the solid organic waste processing unit, and exhausting to the outside a portion of the gas processed in the heat exchanger or a portion of the gas transferred from the processing tank of the solid organic waste processing unit. Further, the solid organic waste processing apparatus described in U.S. patent application Ser. No. 08/292204 further includes a deodorizing apparatus for deodorizing at least a portion of the gas transferred from the processing tank and/or at least a portion of the gas processed in the heat exchanger, and a neutralizing apparatus for neutralizing a liquid (weakly acidic) condensed in the heat exchanger by a weakly alkaline neutralizer. By this solid organic waste processing apparatus, solid organic waste can be processed continuously, efficiently and in a wide range from home scale to business scale.

However, in the above-mentioned conventional technology and U.S. patent application Ser. No. 08/292204 proposed by the applicants, no consideration is given to downsizing a space for installing it (compactness) or beauty in outlook in installing the processing apparatus in restaurants or food stores. Further, no consideration is given to easiness in using it such as easiness in dumping waste etc. when a user uses the processing apparatus.

SUMMARY OF THE INVENTION

It is an object of the present invention to provide a solid organic waste processing apparatus excellent in compactness capable of downsizing a space for installing it in restaurants etc.

Further, it is another object of the present invention to provide a solid organic waste processing apparatus which is easy to use such as easy to dump waste by a user etc.

Further, it is still another object of the present invention to provide a solid organic waste processing apparatus excellent in maintenance performance.

Further, it is still another object of the present invention to provide a solid organic waste processing apparatus capable of efficiently removing moisture in a heat exchanger for processing a gas in the solid organic waste processing tank.

According to an aspect of the present invention, there is provided a solid organic waste processing apparatus including a processing tank for receiving a solid organic waste, fermenting the solid organic waste to thereby form a compost and discharging the compost, and a heat exchanger provided outside of the processing tank for condensing vapor in a gas transferred from the processing tank into a liquid and discharging the liquid, wherein the heat exchanger is provided via an interval at a side face of the processing tank on a side of discharging the compost.

According to another aspect of the present invention, there is provided the solid organic waste processing apparatus, further including a blast fan for blowing outside air to the heat exchanger on a side thereof opposite to a side of the processing tank thereof.

According to another aspect of the present invention, there is provided the solid organic waste processing apparatus, further including a suction pipe having a suction port on the side of a dump port of the processing tank for dumping the solid organic waste and extended to the side of the processing tank for discharging the compost whereby the gas in the processing tank is transferred to the heat exchanger.

According to another aspect of the present invention, there is provided the solid organic waste processing apparatus, wherein the suction port is installed at an upper portion in the processing tank and the suction pipe is installed to pass at the upper portion in the processing tank.

According to another aspect of the present invention, there is provided the solid organic waste processing apparatus, further including a recirculating pipe for connecting the heat exchanger to the side of the processing tank for discharging the compost whereby the gas from the processing tank which has been removed of moisture by the heat exchanger is recirculated to the side of the processing tank for discharging the compost.

According to another aspect of the present invention, there is provided the solid organic waste processing apparatus, further including a neutralizing apparatus for neutralizing condensed water generated by the processing in the heat exchanger, and deodorizing apparatus for deodorizing at least a portion of the gas transferred from the processing tank and exhausting the deodorized gas to outside air, wherein the neutralizing apparatus and the deodorizing apparatus are arranged at a lower side of the heat exchanger.

According to another aspect of the present invention, there is provided the solid organic waste processing apparatus, further including a compost stocker for accommodating the compost discharged from the processing tank, disposed more outer than the neutralizing apparatus and the deodorizing apparatus in view from a front side of the solid organic waste processing apparatus.

According to another aspect of the present invention, there is provided the solid organic waste processing apparatus, further including a door for opening and closing the dump port of the processing tank, wherein the door is provided with hinges installed on the left side or the right side of the door in view from the front of the solid organic waste processing apparatus and a handle installed on the front side of the processing apparatus.

According to another aspect of the present invention, there is provided the solid organic waste processing apparatus, further including outer panels of the solid organic waste processing apparatus each formed in a box shape by bending four sides of a flat plate, attaching plates having a L shape arranged at both sides of the outer panels and flat plates arranged in contact with frames of the processing apparatus and having an approximately same width with the frames, wherein the attaching plates are fixed on the flat plates thereby attaching the outer panels to the frames of the processing apparatus.

According to another aspect of the present invention, there is provided the solid organic waste processing apparatus, further comprising outer panels of the solid organic waste processing apparatus each formed in a box shape by bending four sides of a flat plate, hinges installed on one side of the outer panel and flat plates installed in contact with frames of the processing apparatus and having an approximately same width with the frames, wherein the hinges are fixed on the flat plates thereby attaching the outer panels to the frames of the processing apparatus.

According to another aspect of the present invention, there is provided the solid organic waste apparatus, wherein a portion or a total of a top face of the solid organic waste processing apparatus is inclined such that an outer side of the top face of the processing apparatus is lower and an inner side thereof is higher and a dump port for dumping the solid organic waste is provided on the inclined face.

According to another aspect of the present invention, there is provided the solid organic waste processing apparatus, wherein the suction port is disposed at a position contiguous to the dump port for dumping the solid organic waste.

According to another aspect of the present invention, there is provided the solid organic waste processing apparatus, further including a filter installed at the suction port, wherein the suction port is installed at more inner side of the processing apparatus than the dump port for dumping the solid organic waste and the filter is inclined such that a portion thereof on the side of the dump port for dumping the solid organic waste is higher and a portion thereof on an inner side of the processing apparatus is lower.

According to another aspect of the present invention, there is provided the solid organic waste processing apparatus, wherein the filter is formed detachably from the suction port through the dump port for dumping the solid organic waste.

According to another aspect of the present invention, there is provided the solid organic waste processing apparatus, wherein a position of installing the heat exchanger is disposed lower than a position of installing the suction pipe in the processing tank such that the suction pipe outside of the processing tank is inclined downwardly toward the heat exchanger.

BRIEF DESCRIPTION OF THE DRAWINGS

FIG. 3 is a side view of the processing apparatus of the present invention illustrated in FIG. 1 of which side plate is removed;

FIG. 4 is another side view of the processing apparatus of the present invention illustrated in FIG. 1 of which side plate is removed;

FIGS. 10 through 13 are explanatory views showing structure of outer panels of a processing apparatus of the present invention.

DETAILED DESCRIPTION OF THE PREFERRED EMBODIMENTS

Figure 1:
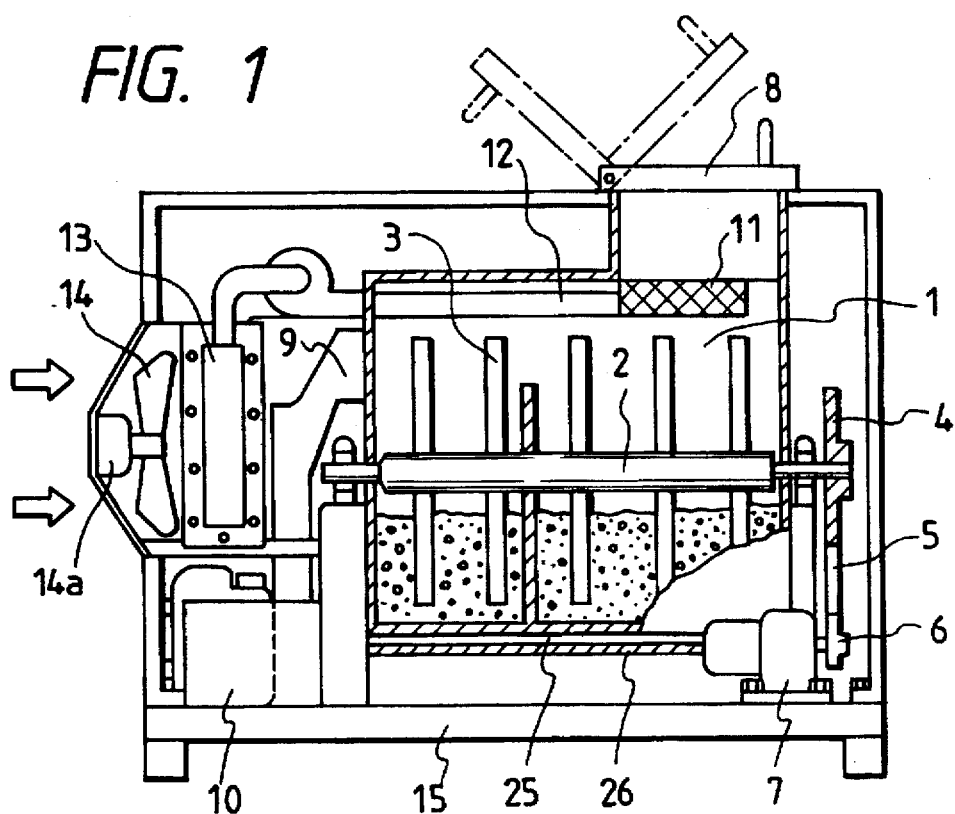
FIG. 1 is a longitudinal sectional view showing an embodiment of a solid organic waste processing apparatus according to the present invention.

FIG. 1 is a longitudinal sectional view showing an example of a processing apparatus of the present invention having a single processing tank with a box shape. A rotating shaft 2 is installed at the central portion of a processing tank 1 and a plurality of rotating vanes 3 for agitation are radially fixed to the rotating shaft 2 at predetermined intervals as shown in FIG. 4. A large sprocket 4 is fixed to one end of the rotating shaft 2 penetrating through the processing tank 1, which is rotatably connected to a drive motor 7 via a chain 5 and a small sprocket 6. A heater 25 (electric heater etc.) and an insulating material 26 covering the heater 25 are installed on an outer wall of the bottom of the processing tank whereby dumped solid organic waste is maintained at a temperature (for example, 50° through 80° C.) for efficiently and sufficiently fermenting it. A dump port 8 receiving the solid organic waste is provided at the top of the processing tank 1 in a freely opening and closing fashion.

A discharge path 9 for discharging formed compost is provided at an end of the processing tank 1 opposite to the dump port 8 and a compost stocker 10 is installed therebelow. Further, a predetermined amount of seed strain for fermentation is charged at the bottom of the processing tank 1.

A suction port 11 for sucking gas generated from the processing tank is installed at an upper portion in the processing tank 1 and at a location avoiding the rotating vanes 3, and a suction pipe 12 is installed in connection to the suction port 11. The suction port 11 is formed by a wire netting, a perforated plate etc. preventing powder of the waste from being sucked into the heat exchanger. The suction pipe 12 is connected to a heat exchanger 13 at the outside of the processing tank. A blast fan 14 for blowing outer air to the heat exchanger 13 is installed on a side of the heat exchanger opposite to a side of the processing tank. The blast fan is driven by a motor 14a. The processing tank and other structural bodies are supported by frames 15.

Figure 2:
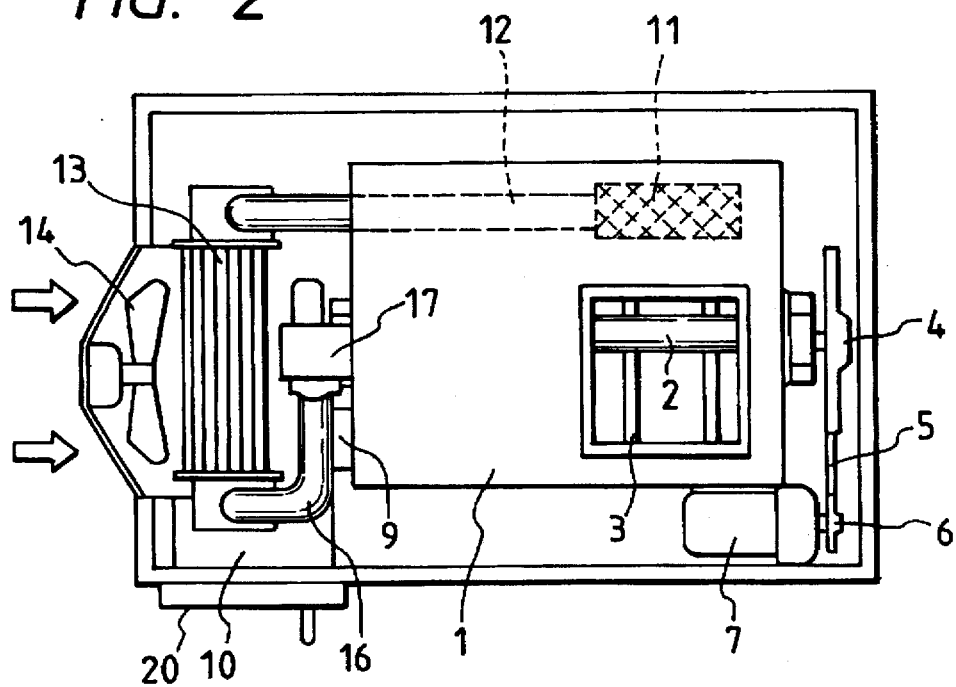
FIG. 2 is a plane view viewing from above the processing apparatus of the present invention illustrated in FIG. 1 of which ceiling plate is removed.

FIG. 2 is a plane view viewing from above the processing apparatus of the present invention illustrated in FIG. 1 wherein a ceiling plate (not shown) is removed. The heat exchanger 13 is disposed in parallel with the processing tank 1 and at the side of discharging the compost of the processing tank. The suction pipe 12 is installed at one end of the heat exchanger 13 and a recirculating pipe 16 is installed at the other end of the heat exchanger 13. The recirculating pipe is further connected to a motor-driven circulating fan 17 and the recirculating fan 17 is installed at one end of the processing tank and is open to the inside of the processing tank.

FIG. 3 is a side view of the processing apparatus of the present invention illustrated in FIG. 1 of which side plate (not shown) is removed. A neutralizing apparatus 18 for neutralizing condensed water and deodorizing apparatus 19 for deodorizing a portion of gas transferred from the processing tank 1 via the neutralizing apparatus 18 and exhausting it to the outside, are arranged at the lower side of the heat exchanger 13. A stocker door 20 formed in a freely opening and closing fashion is installed on the front side of the processing apparatus, for putting the compost stocker 10 in an out of the processing apparatus.

FIG. 4 is a side view of the processing apparatus of the present invention illustrated in FIG. 1 of which side plate (not shown) is removed, which is a side view on the opposite side of FIG. 3. The small sprocket 6 driven by the motor 7 drives via the chain 5 the large sprocket 4 integrated with the rotating shaft 2. The rotation number of the rotating shaft 2 is set at, for example, 3 rotations per minute. The suction port 11 and the suction pipe 12 are disposed at locations not interfering with the rotating vanes 3 in the processing tank 1.

The processing apparatus of the present invention is provided with the above-mentioned basic structure. Next, an explanation will be given of the operation of the processing apparatus of the present invention. A detailed description is given to the operation of a solid organic waste processing apparatus as in the present invention in the above-mentioned U.S. patent application Ser. No. 08/292204. Here, a summary is given to the operation of the processing apparatus of the present invention.

Fermentation fungi (seed strain) are previously charged at the bottom of the processing tank 1 and therefore, when the solid organic waste is dumped into the processing tank 1 from the dump port 8, the solid organic waste is mixed with the fermentation fungi with rotation of the rotating vanes (agitating arms). At the same time air is supplied to the fermentation fungi by agitation.

The fermentation fungi are supplied with heat by heating the processing tank 1 by the heater 25 and with moisture of dumped solid organic waste per se (moisture of 70 through 80% on an average is provided in case of waste having a high water content as in kitchen waste), the three elements for fermentation of moisture, temperature and air are satisfied whereby the fermentation is started.

Next, vapor is generated from the solid organic waste in the process of fermentation and heating. Air in the processing tank containing the vapor is sucked from the suction port 11 arranged at the upper portion in the processing tank 1, and transferred to the heat exchanger 13 provided outside of the processing tank via the suction pipe 12 connected to the suction port 11 and extending through the upper portion in the processing tank 1. Further, the vapor is condensed into a liquid in the heat exchanger 13 and is exhausted. Further, the gas removed of the moisture by receiving heat exchange in the heat exchanger 13 is recirculated to the side of the processing tank 1 on the side of discharging the compost via the recirculating pipe 16. Accordingly, unpleasant odor or the like is not leaked to the outside.

The liquid condensed in the heat exchanger 13 contains substances such as weakly acidic organic acid etc. formed in the process of the fermentation. The neutralizing apparatus 18 is arranged on the lower side of the heat exchanger 13. The weakly acidic liquid is neutralized by a weakly alkaline neutralizer previously charged into the neutralizing apparatus 18.

A portion of the gas transferred from the processing tank 1 is further deodorized in the deodorizing apparatus 19 disposed on the lower side of the heat exchanger 13. The deodorizing apparatus 19 is filled with neutral condensed water discharged from the neutralizing apparatus 18 and aquatic bacteria are filled therein for deodorizing. When the gas is transferred from the processing tank 1 to the deodorizing apparatus 19 by the blower, malodorous components and organic substances contained therein are dissolved in the condensed water in the deodorizing apparatus 19, are decomposed by the aquatic bacteria in the solution and are deodorized.

In case where the processing tank is partitioned in plural numbers, the compost in the processing tank 1 is moved to a successive processing tank portion by overflowing at each partition. Further, it is finally transferred from the processing tank to the discharge path 9 by overflowing and is accommodated in the compost stocker 10 after passing through the discharge path 9.

According to the processing apparatus having the above-mentioned structure, waste having a high water content such as kitchen waste or the like can be processed at a high rate by the high temperature fermentation without using a water content adjustment material such as saw dust etc. and it is possible to process the waste by continuously dumping it.

The following effect is provided to the above-mentioned embodiment of the present invention.

That is, the heat exchanger 13 is provided at the side of the processing tank 1 on the side of discharging the compost via an interval and therefore, the heat exchanger 13 is difficult to receive thermal influence from the processing tank 1 the temperature of which is apt to be higher due to the heater or heat by fermentation. (The fermentation is active on the side of dumping the compost and the temperature at the side is considerably higher than the side of discharging the compost wherein the fermentation is about to finish.) Further, the blast fan 14 provided at the side of the heat exchanger 13 opposite to the side of the processing tank blows outside air to the heat exchanger 13 toward the side of the processing tank 1 and therefore, the heat exchanger 13 is more difficult to receive the thermal influence from the processing tank 1. Therefore, the vapor from the processing tank 1 can efficiently be condensed. Further, it is not necessary to install the heat exchanger 13 apart from the processing tank 1 by more than a necessary distance to reduce the thermal influence and therefore, the processing apparatus can be constituted compactly.

Further, the vapor from the processing tank 1 can efficiently be taken in since the suction port 11 is installed on the side of the dump port 8 wherein much vapor is generated and/or the gas in the processing tank is recirculated by the recirculating pipe 16 from the side of discharging the compost in the processing tank 1.

Further, the heat exchanger 13 and the blast fan 14 are installed at the side face of the processing apparatus and therefore, there is no trouble at all even if the back face side is attached on a wall of a building. Therefore, the processing apparatus can compactly be installed without deteriorating the space performance even in small stores etc. in a city.

Further, with regard to the height of the processing apparatus, the heat exchanger 13 is not disposed at the top or the bottom of the processing tank 1 but at the side thereof and therefore, the height of the total processing apparatus can be minimized since it is almost determined by the height of the processing tank 1.

Further, the suction pipe 12 connecting the suction port 11 and the heat exchanger 13 is installed at the upper portion in the processing tank 1 and therefore, a cooling phenomenon by outer air is not caused and there is no dew condensation caused by cooling the vapor passing through the suction port 11 or the suction pipe 12. Accordingly, water by dew condensation does not drip from the suction port 11 and it is not necessary to wrap insulating material on the outside of the suction pipe 12.

Figure 5:
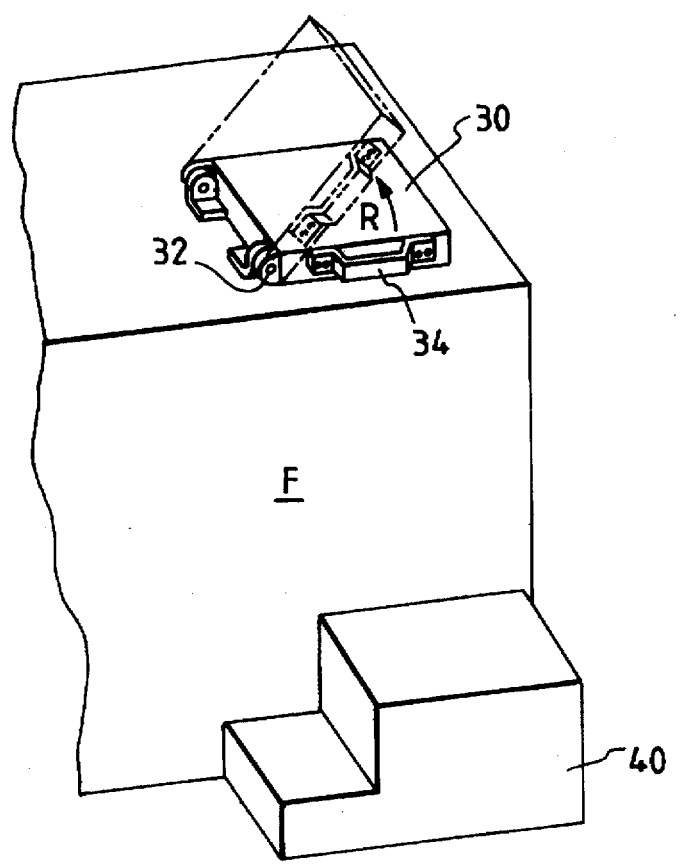
FIG. 5 is an explanatory view showing another embodiment of a door for a dump port of the processing apparatus of the present invention illustrated in FIG. 1.
Figure 6:
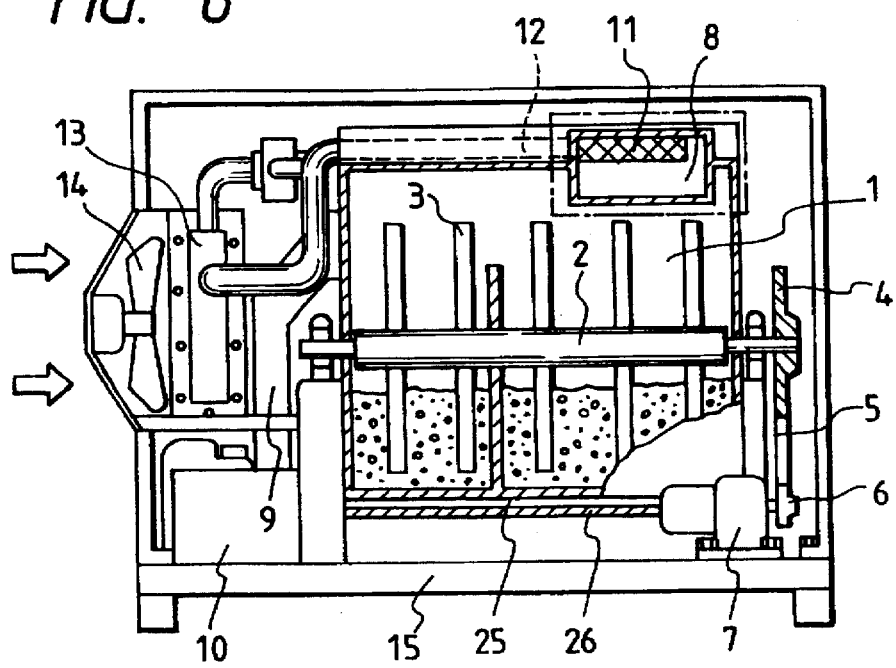
FIG. 6 is a longitudinal sectional view showing another embodiment of a solid organic waste processing apparatus according to the present invention.

FIG. 5 shows a structural example wherein the dump port for dumping the solid organic waste into the processing tank 1 is improved in the processing apparatus illustrated in FIG. 1.

In this embodiment, a door 30 is provided with a structure wherein, for example, four sides of a rectangular flat plate are bent into a box shape, which is provided in the vicinity of a side end of a front face F of the processing apparatus. The door 30 is attached to the frames of the processing apparatus via hinges 32. At this occasion, the positions of attaching the hinges 32 are disposed such that the door 30 is opened and closed in either direction of left or right in view from the front of the processing apparatus. Further, a handle 34 of the door 30 is attached to the front face side of the door 30. A step 40 is placed in front of the processing apparatus to thereby facilitate the dumping in accordance with the necessity. A user climbs the step 40, stands in front of the dump port and opens the door 30 in a direction of the arrow mark R by gripping the handle 34. The door 30 can be opened up to 180° in the direction of the arrow mark R. The handle 34 is not disposed on the back side of the door 30 even if the door 30 is opened by 180° and therefore, it is possible to easily grip the handle 34 also in closing the door 30. It is not always necessary to open the door 30 by 180° and a stopper may be installed such that it is stopped at a position where it is opened by 90° or more. As mentioned above, the door for dumping waste is opened and closed by the hinges in the left and right directions in view from the front and therefore, the operation performance by a user is promoted. Further, the handle of the door is provided in front of the door and therefore, it is easy to grip the handle even when it is opened.

FIGS. 6 through 9 show another example of a processing apparatus of the present invention wherein the processing tank 1 is constituted by two tanks having an approximately box shape. The processing apparatus arranged with the two processing tanks in parallel in such a way is suitable for processing a large amount of waste, which is described in details in the above-mentioned U.S. patent application Ser. No. 08/292204. Here, an explanation will be given centering on portions related to the present invention. Further, notations same as those in FIGS. 1 through 4 designate the same members and the explanation will be omitted.

Figure 7:
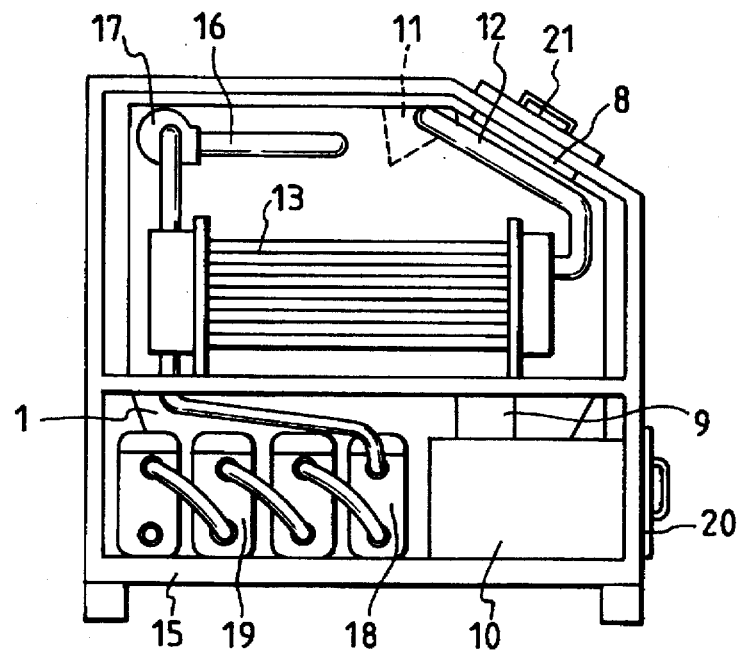
FIG. 7 is a side view of the processing apparatus of the present invention illustrated in FIG. 6 of which side plate is removed.
Figure 8:
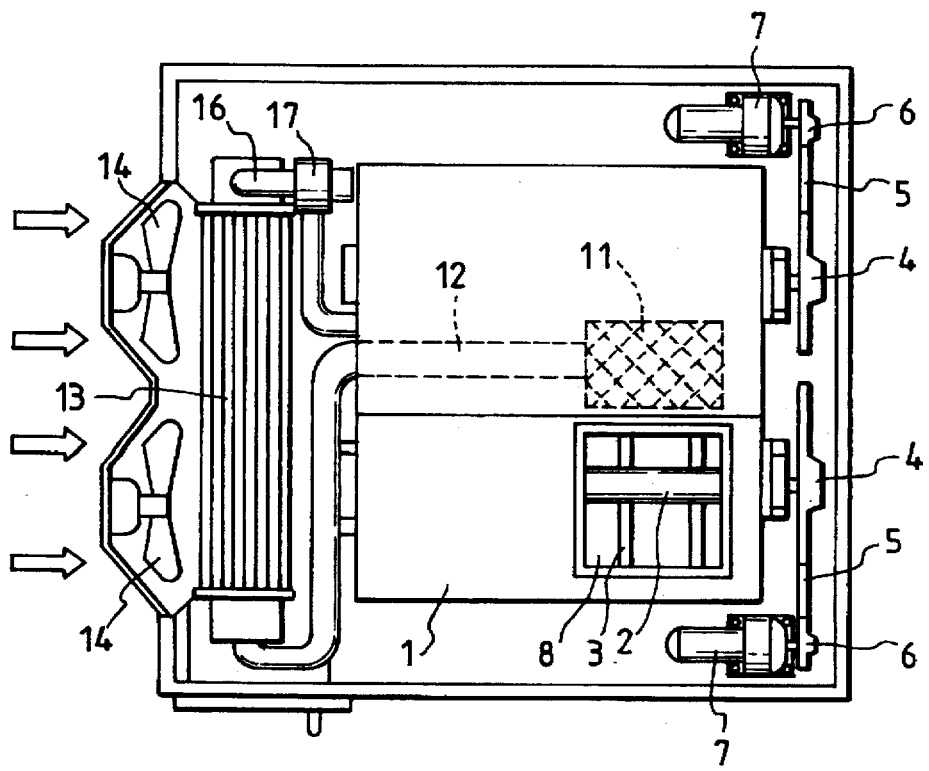
FIG. 8 is a plane view viewing from above the processing apparatus of the present invention illustrated in FIG. 6 of which ceiling plate is removed.

In this embodiment, two processing tanks 1 are provided in parallel to cope with the processing of a large amount of waste, wherein as shown in FIG. 7, sets of the two neutralizing apparatuses 18 and the two deodorizing apparatuses 19 are arranged on the lower side of the heat exchanger 13 and as shown in FIG. 8, sets of the two rotating shafts 2, the two large sprockets 4, the two chains 5, the two small sprockets 6, the two drive motors 7, the two blast fans 14, etc. are arranged.

The dump port 8 for receiving solid organic waste is inclined such that the outer side with respect to the processing apparatus is lower and the inner side thereof is higher and a dump door 21 formed in a freely opening and closing fashion is provided such that it covers the dump port 8.

The suction pipe 12 is extended from the suction port 11 disposed in the vicinity of the dump port 8 to the outside of the processing tank 1 after horizontally passing through the inside of the processing tank 1, inclined toward the heat exchanger 13 which is disposed at a location lower than the suction port 11 and connected to the heat exchanger 13. The recirculating pipe 16 is installed at the other end of the heat exchanger 13. The recirculating pipe 16 is further connected to the motor-driven recirculating fan 17 and the recirculating fan 17 is arranged at one end of the processing tank 1 via the pipe. The heat exchanger 13 is arranged in parallel with the processing tank 1 as in the embodiment illustrated in FIGS. 1 through 4 and is disposed at the side of the processing tank on the side of discharging the compost.

Figure 9:
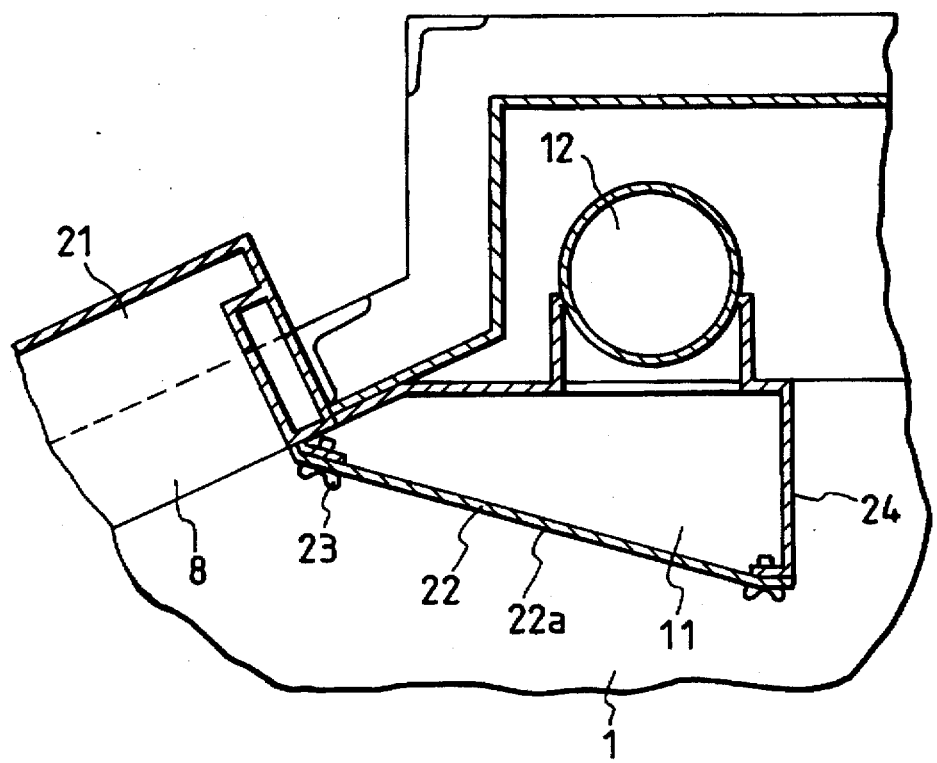
FIG. 9 is a partially magnified longitudinal sectional view showing a detail of a suction port in the processing apparatus of the present invention illustrated in FIG. 6.
Figure 10:
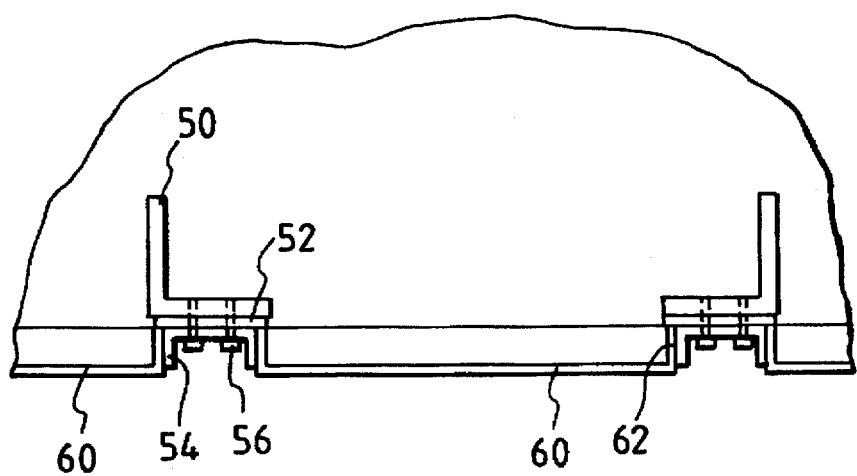
Figure 11:
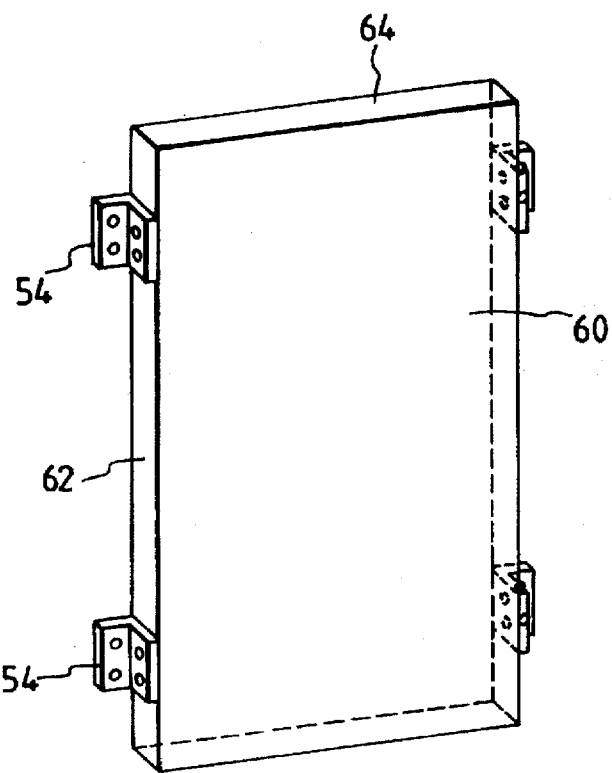

FIG. 9 shows details of the suction port of the processing apparatus in this embodiment. The dump port 8 is inclined such that the outer side with respect to the processing apparatus is lower and the inner side is higher. The suction port 11 is arranged at a position contiguous to the dump port 8 and a filter 22 is installed at the suction port 11. The filter 22 is inclined such that the dump port side is higher and the inner side is lower. A face 22a on the suction side of the filter 22 is easy to clog and it is necessary to clean it periodically. In this embodiment, the filter 22 is easy to optically observe and therefore, the maintenance and check of the filter are facilitated. The filter 22 of the suction port 11 is arranged on a frame 24 of the suction port 11 by thumbscrews 23 etc. such that it can easily be removed.

The following effects are provided to the above-mentioned embodiment of the present invention in addition to the effects of the embodiment illustrated in FIGS. 1 through 4.

That is, the dump port 8 for receiving the solid organic waste is inclined such that the outer side with respect to the processing apparatus is lower and the inner side is higher and therefore, the dumping position is lowered which facilitates the dumping of waste.

Further, the suction pipe 12 in connection to the suction port 11 is inclined toward the heat exchanger 13 disposed at the position lower than the suction port at the outside of the processing tank and therefore, water condensed in the suction pipe 12 naturally flows toward the heat exchanger. Therefore, the treatment of the condensed water is facilitated. Further, the condensed water is not reversed from the suction port 11 into the processing tank 1.

Further, the suction port 11 is installed at the position contiguous to the dump port 8 and the filter 22 is provided at the suction port 11. Furthermore, the filter 22 is inclined such that the side of the dump port 8 is higher and the inner side is lower and therefore, the filter 22 can easily be seen from the dump port 8 and the clogging can easily be checked and the cleaning is facilitated. Further, the filter 22 is provided with a structure wherein it can easily be removed and therefore, the cleaning of the filter can completely be performed. When the filter is not clogged or the cleaning is facilitated, gas is always and sufficiently sucked into the heat exchanger whereby a predetermined processing function can fully be achieved.

FIGS. 10 through 14 show details of the structure of attaching outer panels covering the front face F of the processing apparatus.

An outer panel 60 is provided with a box shape wherein four sides of both side portions 62 and top and bottom portions 64 of a rectangular flat plate are bent inwardly.

The outer panels 60 cover the front face F of the processing apparatus by dividing it into several blocks. The outer panel 60 is formed in a box shape and therefore, the rigidity is promoted and a light panel can be constructed by a thin plate.

Side faces of hinges 54 having a L-shape are fixed to the both side faces 62 of the outer panel 60 and the other side faces of the hinges 54 are fixed to frames 50 of the processing apparatus by bolts 56. An angle having the sectional shape of L, for example, is used for each of the frames 50 having legs 53. The outer panel is made of a material having a good outlook such as a stainless steel plate and the hinges 54 are attached to only portions of the outer panels. Accordingly, the frames 50 are exposed from clearances 70 between the hinges 54. Therefore, flat plates 52 covering the frames 50 are interposed at the front faces of the frames 50 and the hinges 54 are arranged at the front faces of the flat plates 52. The outlook of the processing apparatus can be promoted by making the material of the flat plate 54 the same as that of the panel 60 and by applying a same coating thereon.

Further, the outer panels are formed in blocks each having pertinent dimensions and therefore, only the outer panel of one block may be attached to or detached from in case where the outer panel is removed for maintenance and check, by which the operational performance can be promoted.

The outer panels 60 can be attached to side outer faces of the processing apparatus other than the front face F thereof.

Figure 14:
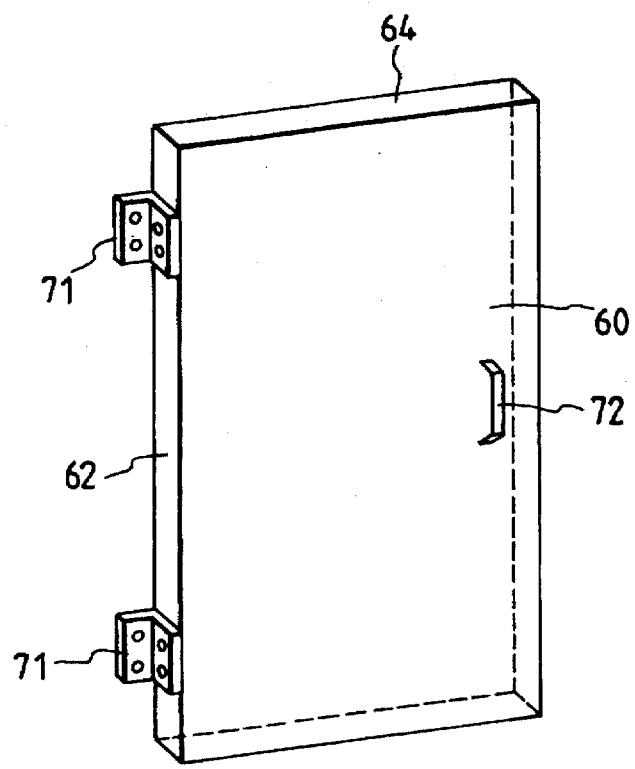
FIG. 14 is an explanatory view showing structure of another embodiment of an outer panel in a processing apparatus of the present invention.
Figure 12:
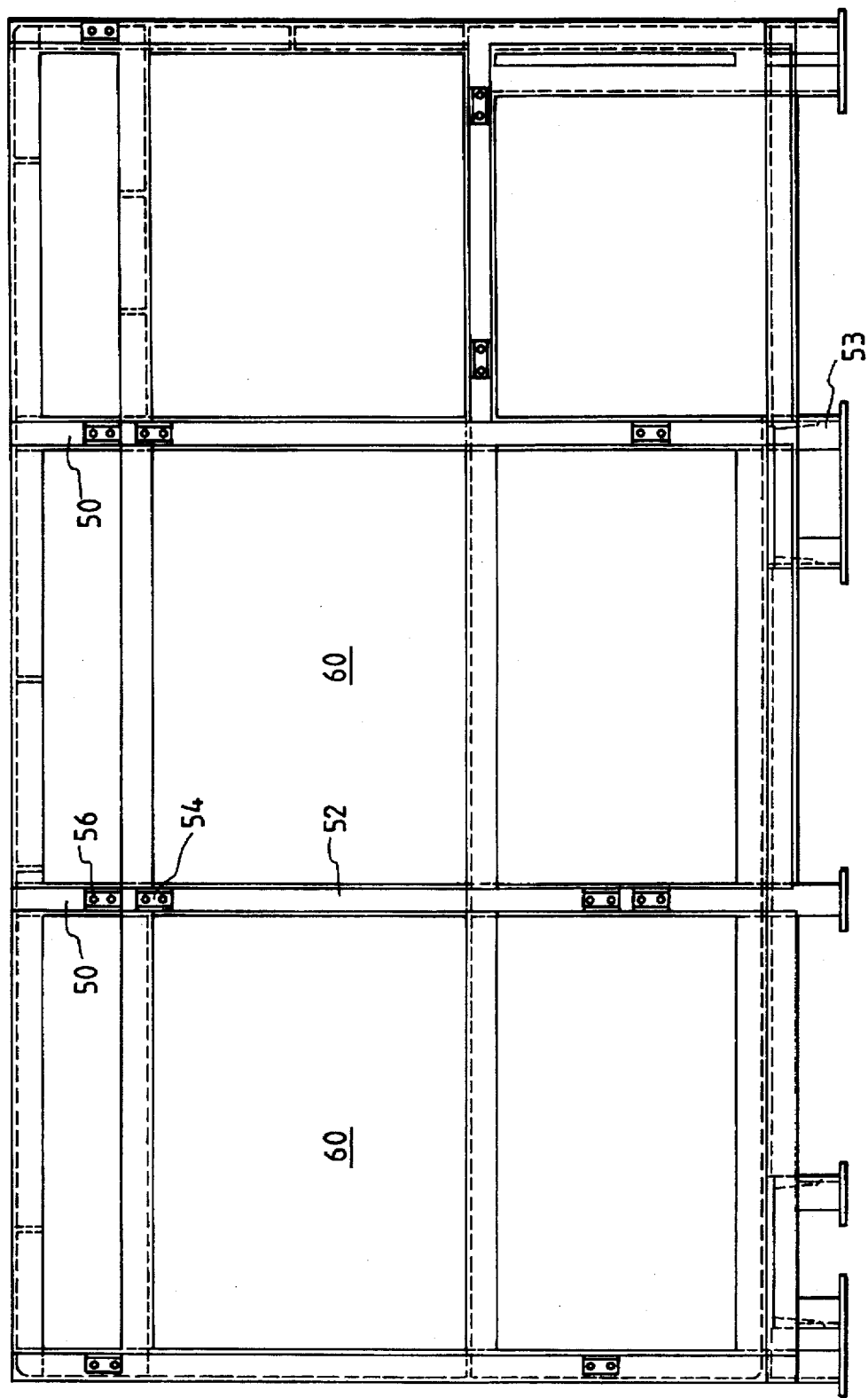

FIG. 14 is an explanatory view showing another embodiment of the structure of attaching the outer panels covering the front face F of the processing apparatus.

The outer panel 60 is provided with the box shape wherein four sides of the both side portions 62 and the top and bottom portions 64 of a rectangular flat plate are bent inwardly.

Side faces of hinges 71 are fixed to one side of the outer panel 60 and the other faces of the hinges 71 are fixed to the frame 50 of the processing apparatus or the flat plate 52 covering the frames 50 by bolts.

A handle 72 or a key (not shown) is attached to the side of the outer panel 60 opposite to the side attaching the hinges, by which the outer panel 60 is opened and closed centering on the hinges 71.

The following effect is provided by the above-mentioned embodiment illustrated in FIGS. 10 through 14. That is, the processing apparatus is provided with the structure covering the outer periphery of the box-shaped frame structure with the outer panels and therefore, the maintenance and check of inner members of the processing apparatus can easily be performed by removing the outer panels. Further, the outer panels are in the box structure in this embodiment and therefore, a light and rigid structure can be provided thereto. Accordingly, the number of attaching bolts of the outer panels can be reduced and the operational performance can be promoted. Further, the flat plates are arranged between the contiguous panels and therefore, the outlook is promoted.

What is claimed is:

1. A solid organic waste processing apparatus comprising:
   a processing tank receiving solid organic waste, fermenting the solid organic waste into a compost and discharging the compost; and
   a heat exchanger provided outside the processing tank, for condensing vapor in a gas transferred from the processing tank into a liquid and discharging the liquid,
      wherein the heat exchanger is provided via an interval at a side face of the processing tank on a side of discharging the compost.

2. A solid organic waste processing apparatus according to claim 1, further comprising a blast fan on a side of the heat exchanger opposite to a side of the processing tank thereof, for blowing outside air to the heat exchanger.

3. A solid organic waste processing apparatus according to claim 1, further comprising a suction pipe having a suction port on a side of a dump port of the solid organic waste of the processing tank and provided extending on the side of discharging the compost of the processing tank,
   wherein the heat exchanger is connected to the suction pipe and receives the gas from the processing tank.

4. A solid organic waste processing apparatus according to claim 3, wherein the suction port is provided at a position of an upper portion in the processing tank and the suction pipe is provided to pass at the upper portion in the processing tank.

5. A solid organic waste processing apparatus according to claim 3, further comprising a recirculating pipe connecting the heat exchanger to the side of discharging the compost of the processing tank, for recirculating air from the processing tank of which moisture has been removed by the heat exchanger to the side of discharging the compost of the processing tank.

6. A solid organic waste processing apparatus according to claim 1, further comprising:
   a neutralizing apparatus for neutralizing condensed water generated by a processing at the heat exchanger; and
   a deodorizing apparatus for deodorizing at least a portion of a gas transferred from the processing tank and discharging the gas to outside air,
      wherein the neutralizing apparatus and the deodorizing apparatus are arranged at a lower side of the heat exchanger.

7. A solid organic waste processing apparatus according to claim 6, further comprising a compost stocker for accommodating the compost discharged from the processing tank, wherein the neutralizing apparatus and the deodorizing apparatus are disposed on an inner side of the solid organic waste processing apparatus in view from a side of a front face thereof and the compost stocker is arranged on an outer side thereof.

8. A solid organic waste processing apparatus according to claim 1, further comprising a door for opening and closing a dump port of the processing tank, said door comprising:

hinges arranged on a left side or on a right side of the door in view from a front face of the solid organic waste processing apparatus; and a handle arranged on a side of the front face of the processing apparatus.

9. A solid organic waste processing apparatus according to claim 1, further comprising:

outer panels of the solid organic waste processing apparatus each formed in a box shape by bending four sides of a flat plate;

attaching plates in a L-shape provided at both sides of the outer panels; and flat plates arranged in contact with frames of the processing apparatus and having a width approximately same as a width of the frames,
wherein the attaching plates are fixed on the flat plates, by which the outer panels are attached to the frames of the processing apparatus.

10. The solid organic waste processing apparatus according to claim 1, further comprising:

outer panels of the solid organic waste processing apparatus each formed in a box shape by bending four sides of a flat plate;

hinges arranged at one side of each of the outer panels; and flat plates arranged in contact with frames of the processing apparatus and having a width approximately same as a width of the frames,
wherein the hinges are fixed on the plates, by which the outer panels are fixed to the frames of the processing apparatus.

11. The solid organic waste processing apparatus according to claim 4, wherein a portion or a total of an upper face of the solid organic waste processing apparatus is inclined such that an outer side of the processing apparatus is lower and an inner side thereof is higher, and a dump port of the solid organic waste is provided at the inclined portion of the upper face.

12. The solid organic waste processing apparatus according to claim 11, wherein the suction port is disposed at a position contiguous to the dump port of the solid organic waste.

13. The solid organic waste processing apparatus according to claim 12, further comprising a filter installed at the suction port, wherein the suction port is installed at a side of the processing apparatus more inner than the dump port of the solid organic waste, and the filter is inclined such that a side of the dump port of the solid organic waste thereof is higher and an inner side of the processing apparatus is lower.

14. The solid organic waste processing apparatus according to claim 13, wherein the filter can be detached from the suction port through the dump port of the solid organic waste.

15. The solid organic waste processing apparatus according to claim 11, wherein the heat exchanger is disposed at a position lower than a position of arranging the suction pipe in the processing tank such that the suction pipe outside the processing tank is inclined downwardly toward the heat exchanger.

16. A solid organic waste processing apparatus comprising:

a processing tank receiving a solid organic waste, fermenting the solid organic waste into a compost and discharging the compost;

a heat exchanger provided at a side face of the processing tank on a side of discharging the compost via an interval, for condensing vapor in a gas transferred from the processing tank into a liquid and discharging the liquid;

a neutralizing apparatus arranged at a lower side of the heat exchanger, for neutralizing condensed water generated by a processing at the heat exchanger;

a deodorizing apparatus arranged at the lower side of the heat exchanger, for deodorizing at least a portion of a gas transferred from the processing tank and discharging the gas to outside air;

a compost stocker arranged at a side of the solid organic waste processing apparatus more outer than the neutralizing apparatus and the deodorizing apparatus in view from a front side of the processing apparatus, for accommodating the compost discharged from the processing tank;

a blast fan provided at a side of the heat exchanger opposite to a side of the processing tank thereof, for blowing outer air to the heat exchanger;

a suction pipe having a suction port disposed at an upper portion and on a side of a dump port of a solid organic waste in the processing tank and provided at the upper portion in the processing tank extending on the side of discharging the compost of the processing tank, for transferring the gas in the processing tank to the heat exchanger; and a recirculating pipe connecting the heat exchanger and the side of discharging the compost of the processing tank, for recirculating air from the processing tank of which moisture has been removed by the heat exchanger to the side of discharging the compost of the processing tank.

17. A solid organic waste processing apparatus according to claim 1, wherein the heat exchanger is disposed parallel to the processing tank.

* * * * *